United States Patent
Tsunai et al.

(10) Patent No.: US 7,485,837 B2
(45) Date of Patent: Feb. 3, 2009

(54) IMAGE SENSOR

(75) Inventors: Shiro Tsunai, Kawasaki (JP); Kosei Tamiya, Tokyo (JP); Tetsuo Kikuchi, Tokyo (JP)

(73) Assignees: NEC Electronics Corporation, Kanagawa (JP); Olympus Corporation, Tokyo (JP); Olympus Imaging Corp., Tokyo (JP)

( * ) Notice: Subject to any disclaimer, the term of this patent is extended or adjusted under 35 U.S.C. 154(b) by 0 days.

(21) Appl. No.: 11/925,114

(22) Filed: Oct. 26, 2007

(65) Prior Publication Data

US 2008/0128590 A1 Jun. 5, 2008

(30) Foreign Application Priority Data

Dec. 4, 2006 (JP) .............................. 2006-326505

(51) Int. Cl.
*H01L 27/146* (2006.01)
*G01J 1/10* (2006.01)

(52) U.S. Cl. ............. 250/208.1; 250/201.2; 250/214 R; 396/128

(58) Field of Classification Search ............... 250/208.1, 250/201.2, 201.4, 201.8, 214 R; 382/216, 382/278; 396/125, 128; 348/297, 345, 350
See application file for complete search history.

(56) References Cited

U.S. PATENT DOCUMENTS 4,523,829 A * 6/1985 Eguchi et al. ................ 396/123
5,027,148 A * 6/1991 Anagnostopoulos ......... 396/96

FOREIGN PATENT DOCUMENTS

| JP | 62-199060 A | 9/1987 |
| JP | 9-14956 A | 1/1997 |
| JP | 2001-33687 A | 2/2001 |
| JP | 2005-300844 A | 10/2005 |

* cited by examiner

*Primary Examiner*—Kevin Pyo
(74) *Attorney, Agent, or Firm*—Sughrue Mion, PLLC

(57) ABSTRACT

In an autofocus image sensor, monitoring pixels are disposed adjacent to a pixel array over a length equal to that of the pixel array in each of a standard portion and a reference portion. Signals from the monitoring pixels of both of the standard portion and the reference portion are subjected to arithmetic operation to control accumulation of electric charges. Thus, an error in position detection is minimized.

10 Claims, 8 Drawing Sheets

IMAGE SENSOR

This application is based upon and claims the benefit of priority from Japanese patent application No. 2006-326505, filed on Dec. 4, 2006, the disclosure of which is incorporated herein in its entirety by reference.

BACKGROUND OF THE INVENTION

This invention relates to an image sensor and, in particular, to an autofocus (automatic focus) image sensor of a correlation detection system.

Autofocusing of a correlation detection system uses a special image sensor to realize its function. In the special image sensor, it is required to obtain a uniform output signal in a wide range of brightness from a dark condition at night to a bright condition under sunlight. For this purpose, the special image sensor generally incorporates means for maintaining a constant output signal even in a situation where brightness variation occurs.

In order to detect a varying brightness, use is made of average light amount detecting pixels generally called a monitoring sensor (or monitoring pixels) to control an exposure time (accumulation time) so that electric charges (signals) generated in a pixel array are kept constant. The correlation detection system is a system for detecting a degree of focusing from locations of two images separated by a separator lens. The image sensor compliant with the correlation detection system is provided with two pixel arrays, called a standard portion and a reference portion, respectively, linearly arranged and adapted to read a same image. Since the same image is read, no functional problem is generally caused as long as the monitoring sensor is disposed in the vicinity of one of the pixel arrays.

An example of a conventional structure of the above-mentioned image sensor is shown in FIGS. 1 and 2. FIG. 1 shows a schematic diagram of the image sensor and FIG. 2 shows a block diagram of a signal control portion thereof. The autofocus image sensor comprises a standard portion 7, a reference portion 8, and a signal control portion 6. The standard portion 7 comprises a CCD (charge transferring portion) 1-1, a pixel array charge detector 2-1, a monitoring charge detector 2-3, a pixel array 3-1, average light amount detecting pixels (hereinbelow referred to as monitoring pixels) 4-1, and a control electrode 5-1. The monitoring pixels 4-1 is for use in monitoring an average light amount of the pixel array 3-1. The pixel array charge detector 2-1 is a signal charge detector for detecting signal charges from the pixel array 3-1. The monitoring charge detector 2-3 is a signal charge detector for detecting signal charges from the monitoring pixels 4-1. The control electrode 5-1 controls supply of charges from the pixel array 3-1 to the CCD 1-1. As a result, the control electrode 5-1 controls supply of charges from the pixel array 3-1 to the pixel array charge detector 2-1 connected to an output of the CCD 1-1. The reference portion 8 comprises a CCD 1-2, a pixel array charge detector 2-2, a pixel array 3-2, and a control electrode 5-2. The pixel array charge detector 2-2 is a signal charge detector for detecting signal charges from the pixel array 3-2. The control electrode 5-2 controls supply of charges from the pixel array 3-2 to the CCD 1-2. As a result, the control electrode 5-2 controls supply of charges from the pixel array 3-2 to the pixel array charge detector 2-2 connected to an output of the CCD 1-2. The signal control portion 6 includes a reference voltage generator 13', a comparator 12', and an accumulation control signal generating portion 14'.

The signal control portion 6 is controlled by a control signal and the comparator 12' compares an output from the monitoring charge detector 2-3 of the standard portion 7 with a reference voltage from the reference voltage generator. On the basis of a result of the comparison, the accumulation control signal generating portion 14' controls the control electrode 5-1 of the standard portion 7 and the control electrode 5-2 of the reference portion 8. However, in order to perform focusing with higher accuracy, it is necessary to control a signal amount into an optimal condition such that a signal (signal charges) of each of the pixel arrays is not saturated. For this purpose, an optimal autofocus image sensor is desired.

Such autofocus image sensor is disclosed in the following patent documents. In Japanese Unexamined Patent Application Publication (JP-A) No. 2005-300844 (corresponding to US2007/098389A1), a standard portion sensor and a reference portion sensor are neighboring in parallel and respective sensor arrays are disposed so as to be relatively deviated from each other. By using the two sensor arrays, signals for focus detection are produced. In Japanese Unexamined Patent Application Publication (JP-A) No. S62-199060, at least two photosensors are provided in the vicinity of a photodiode array. The at least two photosensors produce signals from which a contrast of a subject is detected. Further, Japanese Unexamined Patent Application Publication (JP-A) No. 2001-33687 (corresponding to U.S. Pat. No. 6,445,883B1) discloses a method of reducing focus detection errors by providing a standard portion and a reference portion. Japanese Unexamined Patent Application Publication (JP-A) No. H9-14956 discloses a method of adjusting detection sensitivity.

SUMMARY OF THE INVENTION

As mentioned above, in order to perform focusing with high accuracy, it is necessary to control a signal accumulation time so as to assure an optimal signal amount without saturation of the signal of each of the respective pixel arrays. For the purpose of proper control, it is required to appropriately determine the size and the position of the monitoring pixels. However, depending on variations in lenses, detection sensitivity, and so on and depending on how the subject is illuminated, the amount of light received may be increased in only one of the standard portion and the reference portion. Thus, the amounts of light received at the standard portion and the reference portion are often different from each other. In case where the variations are wide, only one of the standard portion and the reference portion may suffer saturation of the signal or shortage of the signal amount. In this event, position detection may not properly be carried out.

The present invention seeks to solve the problems.

According to one aspect of the present invention, there is provided an image sensor comprising a standard portion and a reference portion, each of the standard portion and the reference portion comprising a pixel array, a pixel array charge detector for producing a signal corresponding to a light amount received in the pixel array, a control electrode for controlling supply of charges from the pixel array to the pixel array charge detector, monitoring pixels for use in monitoring an average light amount of the pixel array, and a monitoring charge detector for producing a signal corresponding to a light amount received in the monitoring pixels, wherein:

the image sensor further comprises a signal control portion for carrying out control so that each of the output signals from the pixel array charge detectors of the standard portion and the reference portion is kept constant;

the signal control portion comprising a minimum detector, a comparator, a reference voltage generator, and a control signal generating portion, the minimum detector producing an output signal corresponding to one of the two output signals from the monitoring charge detectors of the standard portion and the reference portion which has a lower level, the comparator comparing an output from the minimum detector with a reference voltage generated by the reference voltage generator, the control signal generating portion controlling the control electrodes of the standard portion and the reference portion on the basis of a result of comparison by the comparator.

According to another aspect of the present invention, there is provided an image sensor comprising a standard portion and a reference portion, each of the standard portion and the reference portion comprising a pixel array, a pixel array charge detector for producing a signal corresponding to a light amount received in the pixel array, a control electrode for controlling supply of charges from the pixel array to the pixel array charge detector, monitoring pixels for use in monitoring an average light amount of the pixel array, and a monitoring charge detector for producing a signal corresponding to a light amount received in the monitoring pixels, wherein:

the image sensor further comprises a signal control portion for carrying out control so that each of the output signals from the pixel array charge detectors of the standard portion and the reference portion is kept constant;

the signal control portion comprising first and second comparators, a reference voltage generator, and a control signal generating portion, the first comparator comparing the output signal of the monitoring charge detector of the standard portion with a reference voltage generated by the reference voltage generator, the second comparator comparing the output signal of the monitoring charge detector of the reference portion with the reference voltage generated by the reference voltage generator, the control signal generating portion being supplied with outputs of the first and the second comparators and controlling the control electrodes of the standard portion and the reference portion on the basis of results of comparison by the first and the second comparators.

With the above-mentioned structure, it is possible to realize an autofocus image sensor which minimizes an error in position detection due to variations and so on.

DESCRIPTION OF THE PREFERRED EMBODIMENTS

Figure 1:
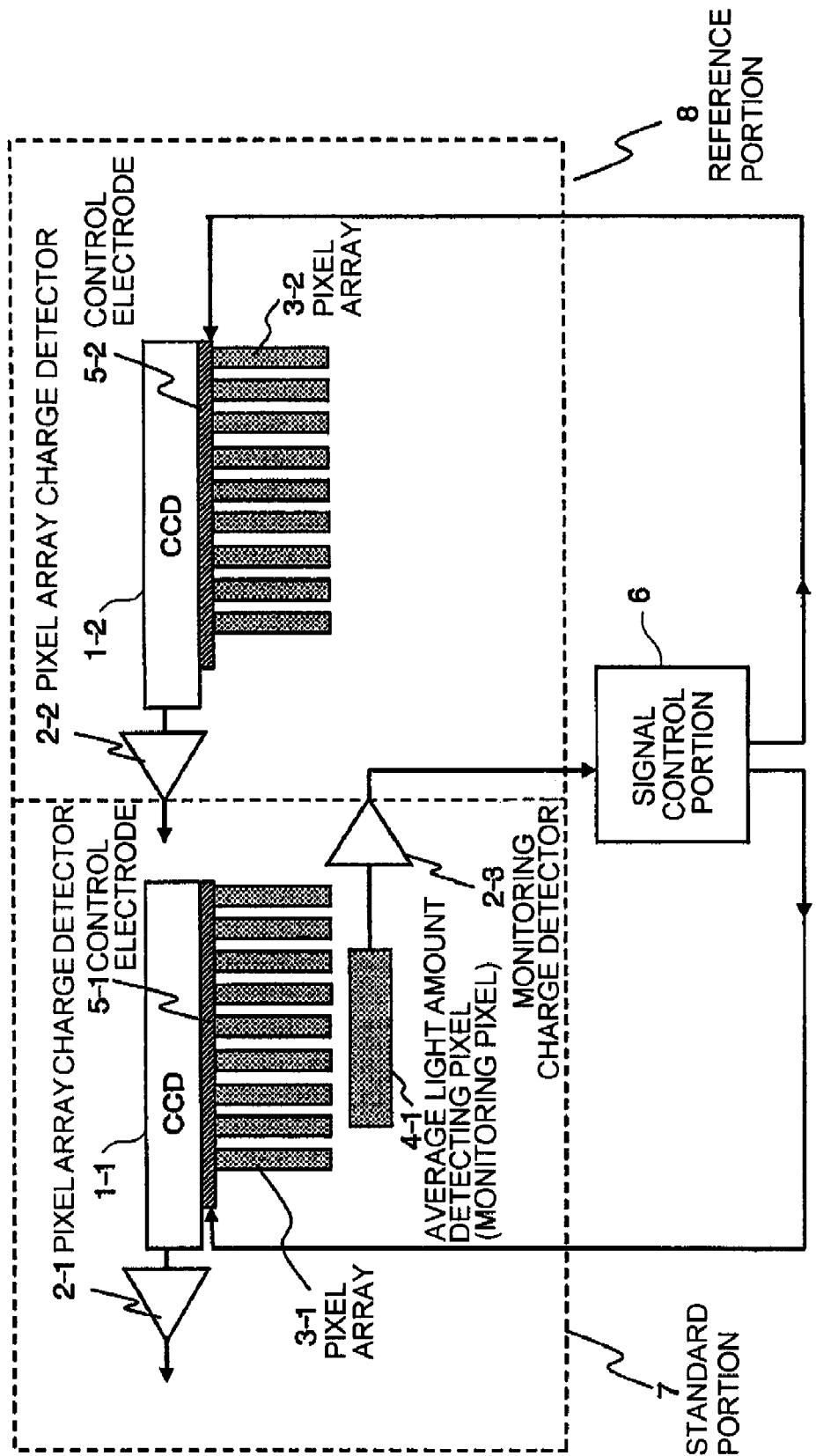
FIG. 1 is a schematic diagram of a conventional autofocus image sensor.
Figure 2:
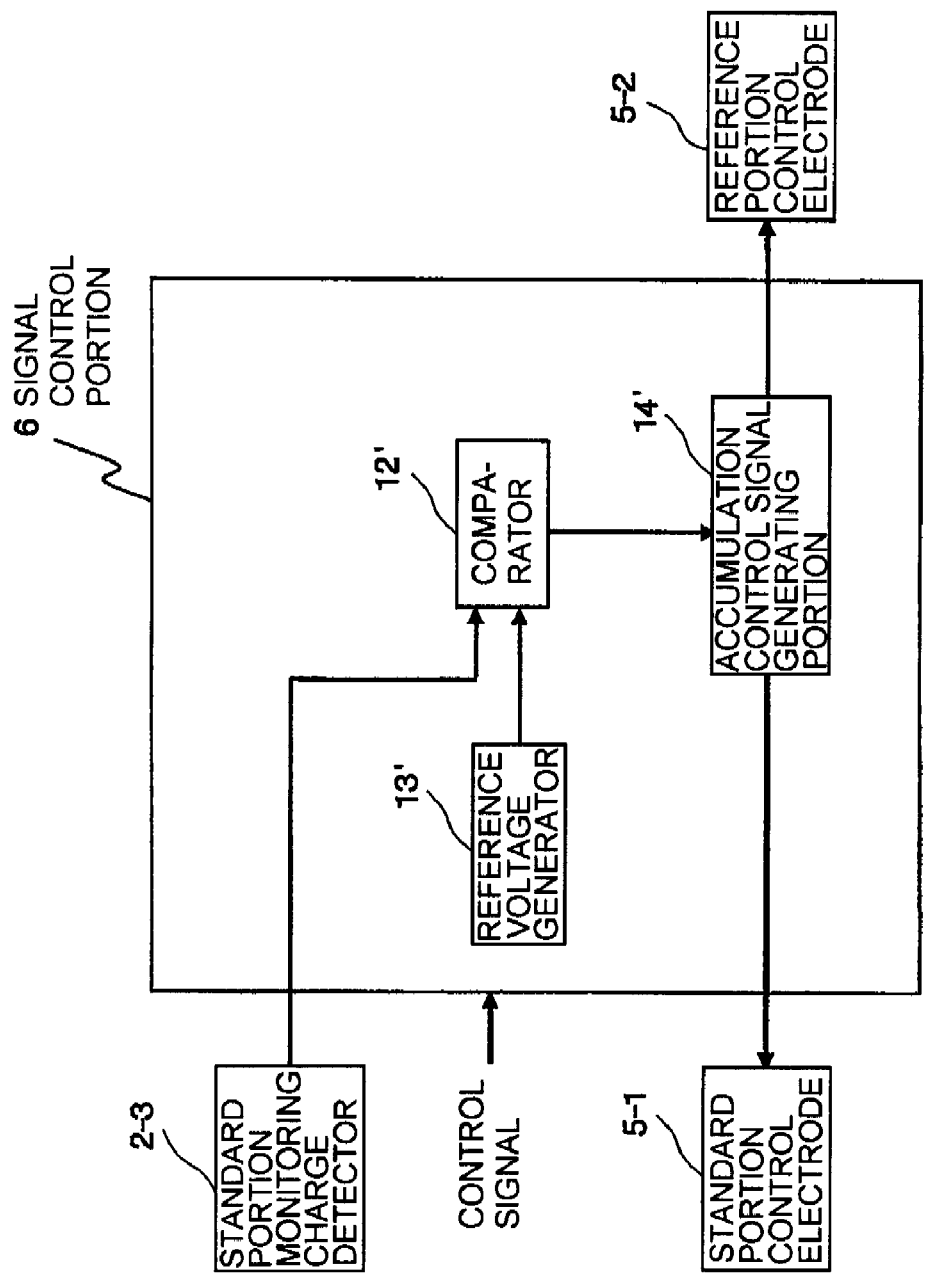
FIG. 2 is a block diagram of a signal control portion illustrated in FIG. 1.

In an image sensor according to an exemplary embodiment of the present invention comprises a standard portion having a pixel array, a pixel array charge detector for producing a signal corresponding to a light amount received in the pixel array, monitoring pixels for detecting an average light amount of the pixel array, and a monitoring charge detector for producing a signal corresponding to a light amount received in the monitoring pixels, and a reference portion having a structure same as that of the standard portion. Further, the image sensor comprises a signal control portion for carrying out control so that the output signal from the pixel array charge detector is kept constant. Thus, the standard portion and the reference portion have the same structure and, in each of the standard portion and the reference portion, the signal amount of the pixel array is controlled by using the signal from the monitoring charge detector for producing the signal corresponding to the light amount generated in the monitoring pixels for detecting the average light amount. Thus, it is possible to obtain an optimal signal amount with variations suppressed.

The signal control portion for performing control in the image sensor of the present invention may be implemented by a minimum detector, a comparator, a reference voltage generator, and a control signal generator. Alternatively, the signal control portion may be realized by a comparator, a reference voltage generator, and a control signal generator which are provided in each of the standard portion and the reference portion.

In the image sensor, the pixel arrays and the monitoring pixels of the standard portion and the reference portion are symmetrically arranged with respect to the center of an image area. Therefore, distances from a lens are easily kept equal to each other. Further, since the monitoring pixels for detecting the average light amount are disposed adjacent to the pixel array, it is possible to obtain, by the monitoring pixels, an average value of light signals equivalent to the light captured in the pixel array. Furthermore, the monitoring pixels for detecting the average light amount are disposed over a width same as that of the pixel array. Therefore, it is possible for the monitoring pixels to obtain average light amount information of all the pixels.

In the image sensor, the minimum detector comprises a first source follower circuit having a first constant current source disposed between a power source and an output line and a drive transistor having a gate supplied with the signal from the monitoring charge detector of the standard portion, and a second source follower circuit having a second constant current source disposed between a power source and an output line and a drive transistor having a gate supplied with the signal from the monitoring charge detector of the reference portion. The output lines of the first and the second source follower circuits are connected to each other. Alternatively, the minimum detector comprises a constant current source disposed between a power source and an output line and a plurality of transistors connected between the output line and a ground voltage. The transistors have gates supplied with outputs from the monitoring charge detectors of the standard portion and the reference portion, respectively.

Figure 3:
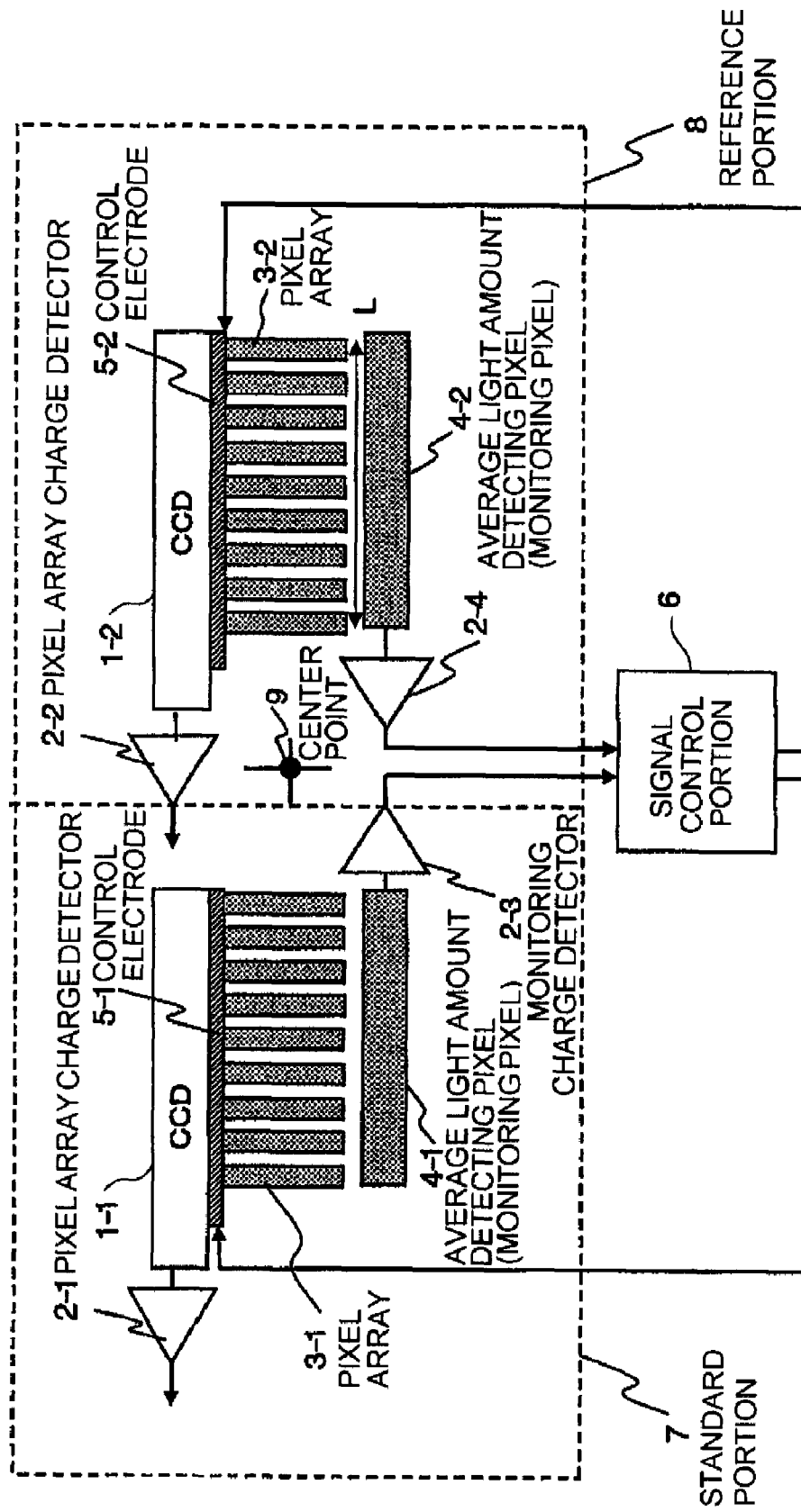
FIG. 3 is a schematic diagram of an autofocus image sensor according to an embodiment of the present invention.
Figure 4:
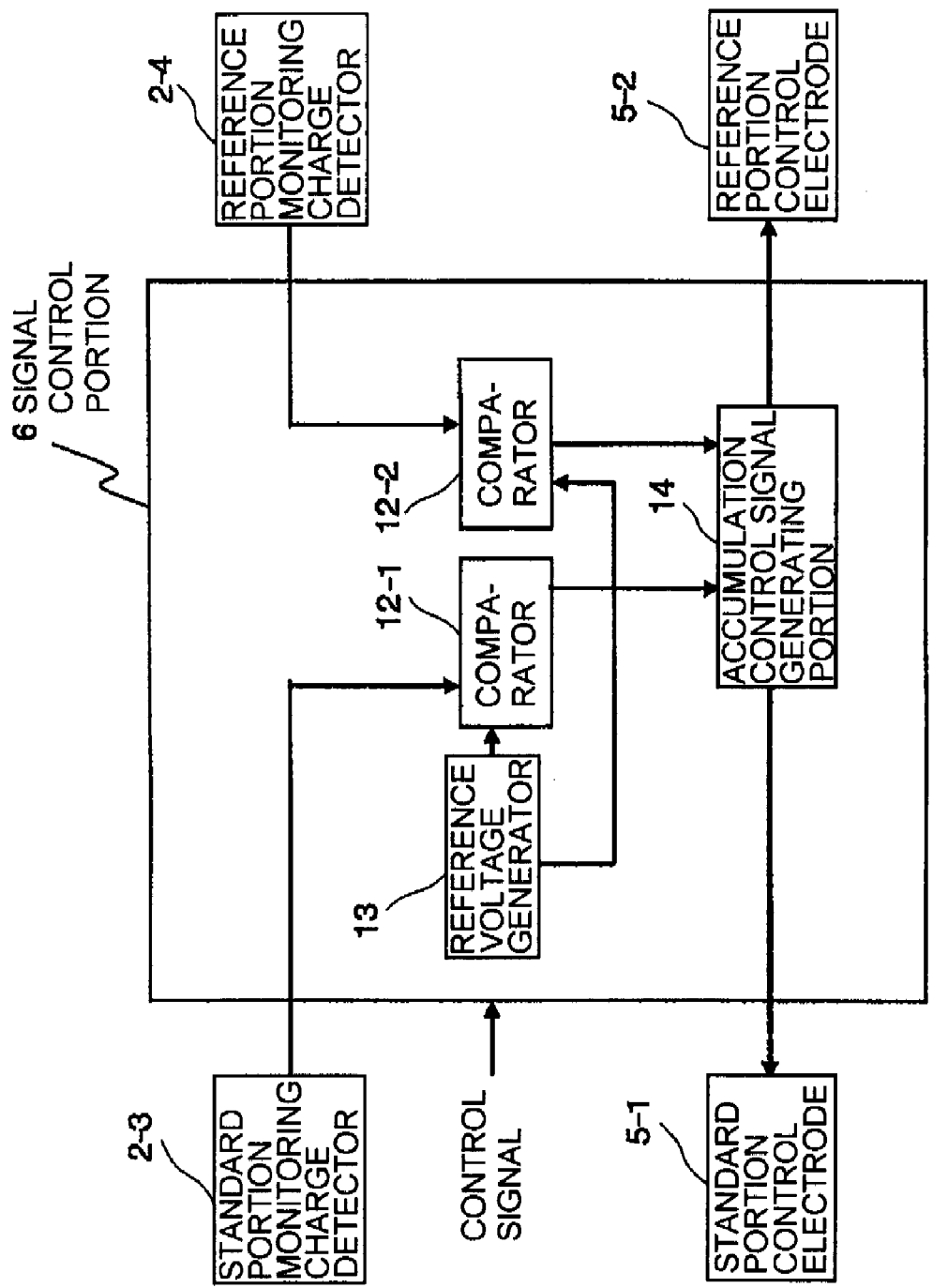
FIG. 4 is a block diagram of a signal control portion of the autofocus image sensor in FIG. 3.
Figure 5A:
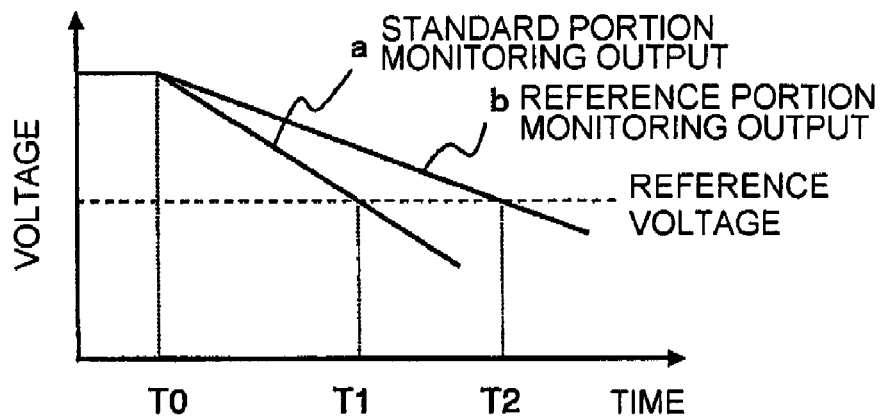
FIGS. 5A and 5B are views for describing an operation of the autofocus image sensor in FIG. 3, FIG. 5A being a waveform chart of accumulation of charges from monitoring pixels, FIG. 5B being a flow chart of the operation.
Figure 5B:
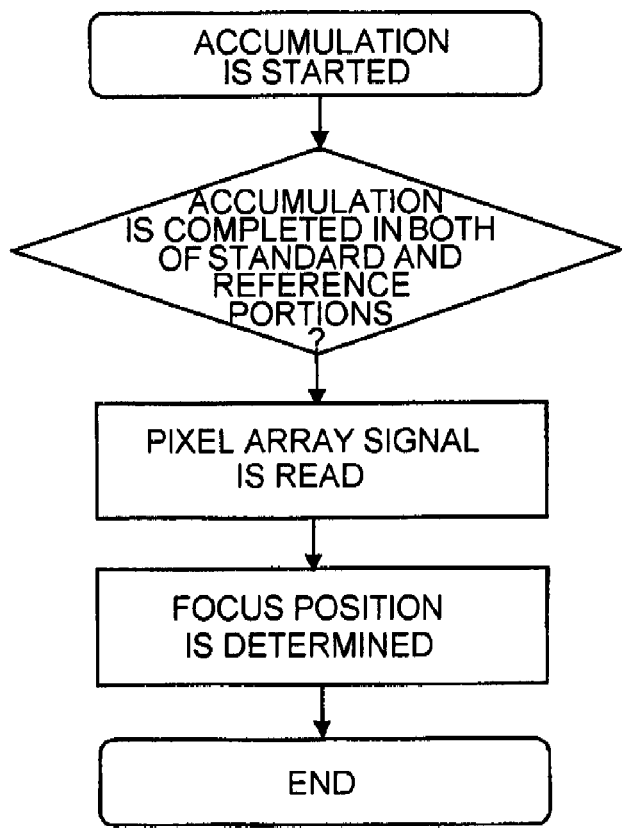
Figure 6:
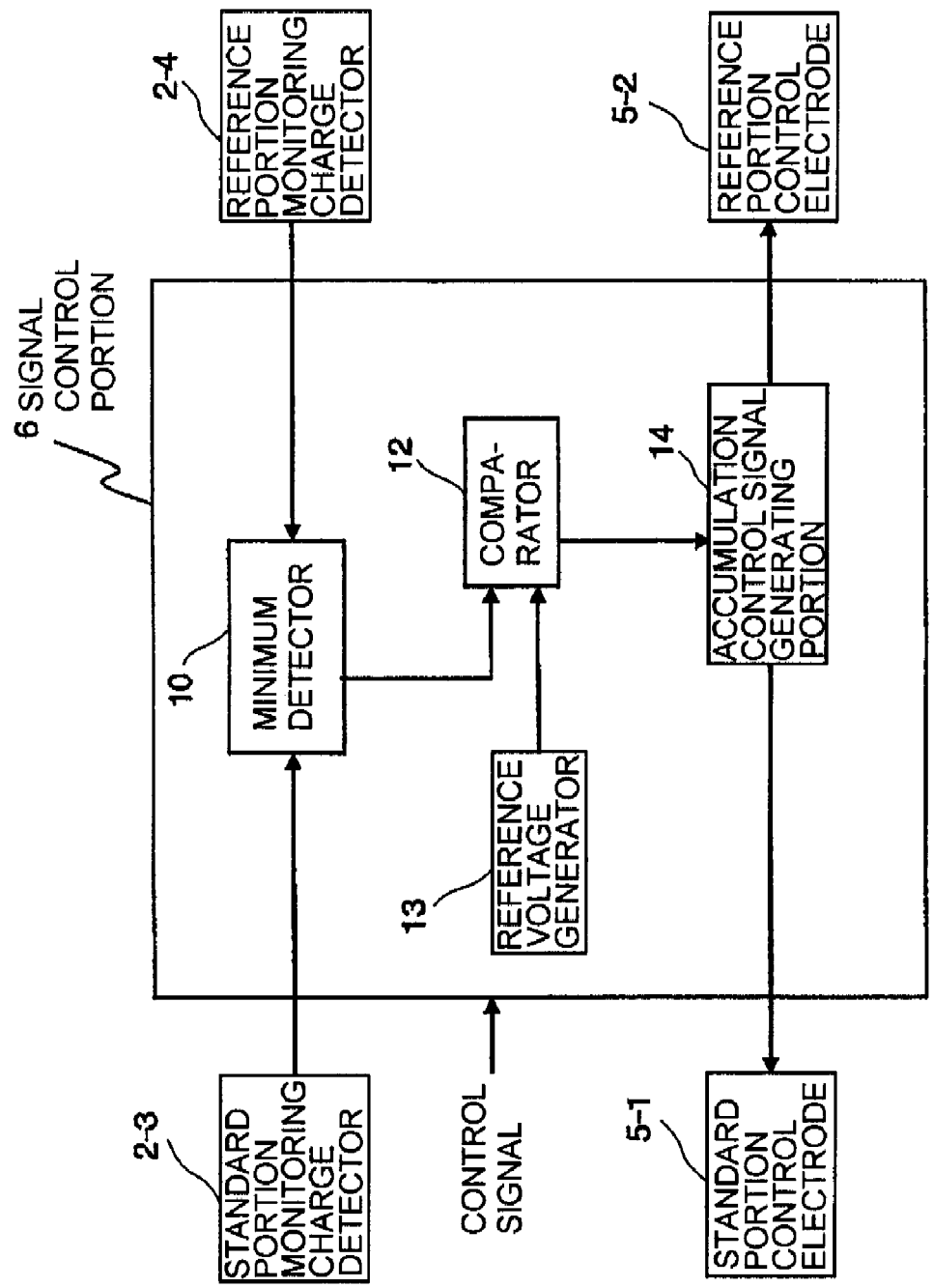
FIG. 6 is a block diagram of a modification of the signal control portion in FIG. 3.
Figure 7:
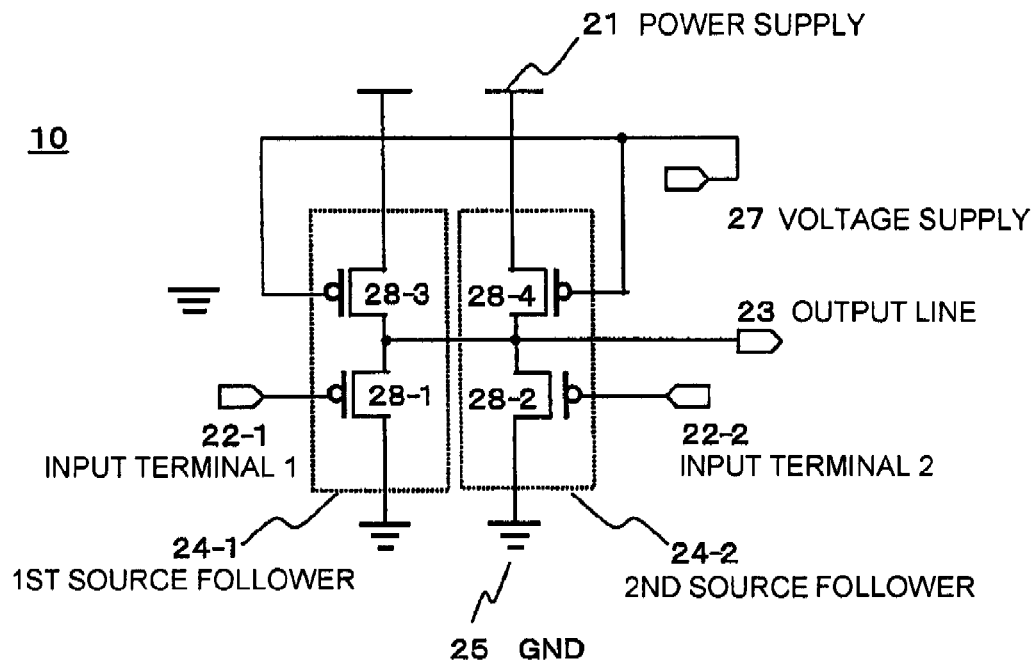
FIG. 7 is a circuit diagram of a minimum detector of the signal control portion in FIG. 6.
Figure 8:
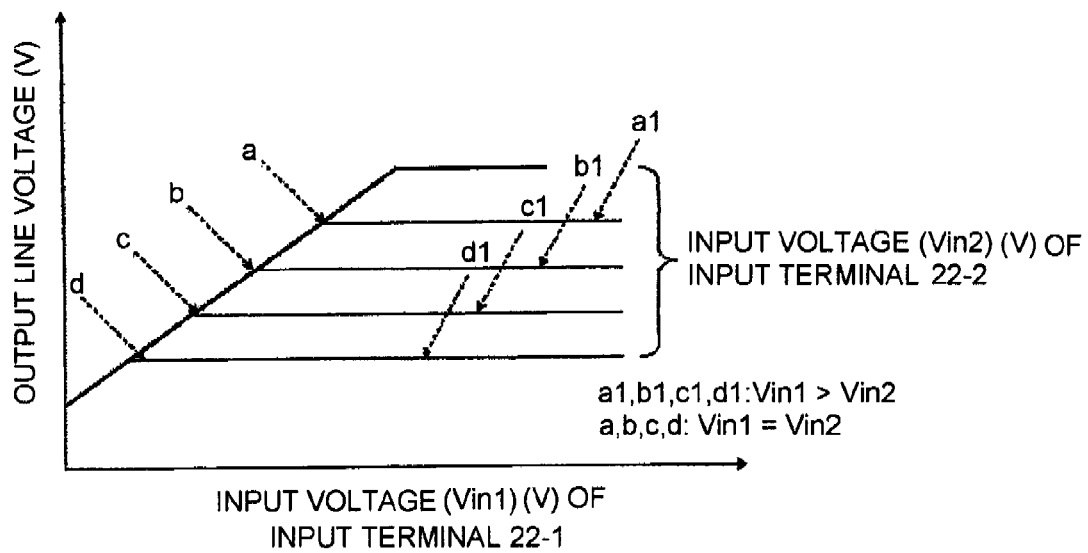
FIG. 8 is a view for describing an operation of the minimum detector of the signal control portion in FIG. 6.
Figure 9:
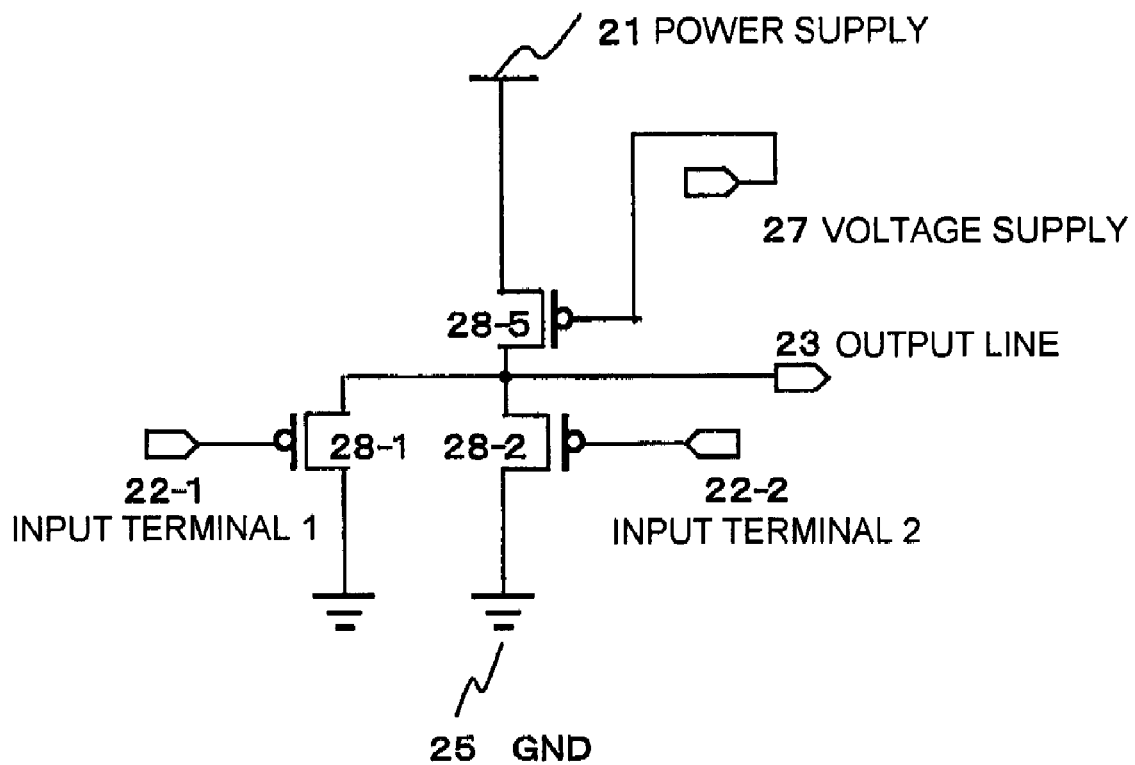
FIG. 9 is a circuit diagram of a modification of the minimum detector of the signal control portion in FIG. 6.

Now, an embodiment of the present invention will be described in detail with reference to the drawing. FIG. 3 is a schematic diagram of an autofocus image sensor and FIG. 4 is a block diagram of a signal control portion thereof. FIGS. 5A and 5B are a waveform chart showing accumulation of charges from monitoring pixels and a flow chart, respectively, for describing an operation of the autofocus image sensor. FIG. 6 is a block diagram of a modification of the signal control portion according to another embodiment. FIGS. 7, 8, and 9 are a circuit diagram of a minimum detector of the signal control portion in FIG. 6, a view for describing an operation thereof, and a circuit diagram of a modification of the minimum detector, respectively.

The autofocus image sensor comprises a standard portion 7, a reference portion 8, and a signal control portion 6. The standard portion 7 comprises a CCD (charge transferring portion) 1-1, a pixel array charge detector 2-1, a monitoring charge detector 2-3, a pixel array 3-1, monitoring pixels 4-1, and a control electrode 5-1. The monitoring pixels 4-1 is for use in monitoring an average light amount of the pixel array 3-1. The pixel array charge detector 2-1 is a detector for detecting signal charges from the pixel array 3-1. The monitoring charge detector 2-3 is a detector for detecting signal charges from the monitoring pixels 4-1. The control electrode 5-1 controls supply of charges from the pixel array 3-1 to the CCD 1-1. As a result, the control electrode 5-1 controls supply of charges from the pixel array 3-1 to the pixel array charge detector 2-1 connected to an output of the CCD 1-1. The reference portion 8 comprises a CCD 1-2, a pixel array charge detector 2-2, a monitoring charge detector 2-4, a pixel array 3-2, monitoring pixels 4-2, and a control electrode 5-2. The monitoring pixels 4-2 is for use in monitoring an average light amount of the pixel array 3-2. The pixel array charge detector 2-2 is a detector for detecting signal charges from the pixel array 3-2. The monitoring charge detector 2-4 is a detector for detecting signal charges from the monitoring pixels 4-2. The control electrode 5-2 controls supply of charges from the pixel array 3-2 to the CCD 1-2. As a result, the control electrode 5-2 controls supply of charges from the pixel array 3-2 to the pixel array charge detector 2-2 connected to an output of the CCD 1-2. The pixel arrays shown in the figure may include means for controlling an accumulation time of signals from pixels.

With respect to a center point 9, the pixel array and the monitoring pixels of the standard portion 7 and the reference portion 8 are disposed symmetrically with each other. Over the entire width (L) of each of the pixel arrays, the monitoring pixels are disposed adjacent to the pixel array. Each of the pixel array charge detectors 2-1 and 2-2 produces an output which is a signal output from the pixel array for use in autofocusing and which is connected to a signal processing circuit (not shown) in a subsequent stage. Each of the monitoring pixels 4-1 and 4-2 produces an output which has a level substantially equivalent to an average light amount illuminating each of the pixel arrays 3-1 and 3-2. On the basis of the output, a signal amount accumulated in each pixel array can be estimated. Each of the control electrodes 5-1 and 5-2 is supplied with a control signal which is generated in the signal control portion 6 by using an accumulation charge signal of each of the monitoring pixels 4-1 and 4-2 provided in the standard portion 7 and the reference portion 8.

The signal control portion 6 comprises a reference voltage generator 13, first and second comparators 12-1 and 12-2, and an accumulation control signal generating portion 14 and is controlled by a control signal supplied thereto. The first comparator 12-1 compares an output from the monitoring charge detector 2-3 of the standard portion 7 with a reference voltage from the reference voltage generator 13. Similarly, the second comparator 12-2 compares an output from the monitoring charge detector 2-4 of the reference portion 8 with the reference voltage from the reference voltage generator 13. As a result of the comparison, the accumulation control signal generating portion 14 controls each of the control electrode 5-1 of the standard portion 7 and the control electrode 5-2 of the reference portion 8.

Referring to FIGS. 5A and 5B, the above-mentioned operation will be described. At a time instant T0, the monitoring charge detectors 2-3 and 2-4 start accumulation of signals (electric charges) from the monitoring pixels 4-1 and 4-2, respectively. In FIG. 5A, signal waveforms of the monitoring pixels are shown. Specifically, a line a shows a charge accumulation voltage of the monitoring charge detector 2-3 of the standard portion 7 and a line b shows a charge accumulation voltage of the monitoring charge detector 2-4 of the reference portion 8. At a time instant T1, the monitoring charge detector 2-3 of the standard portion 7 completes accumulation to the reference voltage. At a time instant T2, the monitoring charge detector 2-4 of the reference portion 8 completes accumulation to the reference voltage. Thus, the signals (electric charges) corresponding to light are time-integrated to produce signals (voltages). The signals (voltages) are compared with the reference voltage and an average signal amount of the pixel array is estimated. Then, the accumulation is completed. In both of the standard portion 7 and the reference portion 8, the accumulation is completed and pixel array signals are read to determine a focus position.

The accumulation control signal generating portion 14 controls an accumulation time by using a signal amount of the monitoring pixels so that the signal amount of the pixel array is not saturated. Herein, the accumulation time is a time required until the electric charges accumulated in each of the monitoring charge detectors 2-3 and 2-4 of the standard portion 7 and the reference portion 8 become equal to the reference voltage. Therefore, it is possible to carry out control so that the signal amount of each of the pixel arrays of the standard portion 7 and the reference portion 8 is not saturated and the accumulated charges in each of the pixel arrays of the standard portion 7 and the reference portion 8 are constant. Thus, an output signal of each of the pixel array charge detectors 2-1 and 2-2 is controlled to be constant by the control signal from the accumulation control signal generating portion 14.

A substantially same image is reflected or projected on the pixel array and the monitoring pixels. In the pixel array, the signal amount is different in every pixel. Since the monitoring pixels are disposed over the entire width (L) of the pixel array, a signal amount approximate to the average signal amount of the pixel array is generated by light. The monitoring pixels having a same structure are symmetrically disposed in the standard portion 7 and the reference portion 8, so that signals of the pixel arrays have a substantially same signal amount both in the standard portion 7 and the reference portion 8 even upon occurrence of variation in light amount due to factors such as lenses.

By the signals from the monitoring pixels of each of the standard portion 7 and the reference portion 8, accumulation of signals from the pixel array is individually controlled. The accumulation charge voltage from the monitoring pixels is compared with the reference voltage, so that an optimum signal amount can be obtained without saturation of the signal of each of the pixel arrays. With this structure, it is possible to obtain an autofocus image sensor in which an error in position detection is minimized.

Referring to FIG. 6, a signal control portion 6' is a modification of the signal control portion 6. Herein, the signal control portion 6' is simplified in circuit structure by using a minimum detector 10 for selecting one of the monitoring charge detector outputs from the standard portion 7 and the reference portion 8 which has a lower level. The output selected by the minimum detector 10 is compared with the reference voltage to control the accumulation time on the basis of a result of comparison. Each of the monitoring charge detectors 2-3 and 2-4 produces a high voltage and a low voltage when an amount of incident light is small and large, respectively. Therefore, by selecting one of the outputs which has a lower level, it is possible to prevent saturation of the pixel arrays, that is, occurrence of a state where autofocusing is impossible.

The signal control portion 6' shown in FIG. 6 comprises a minimum detector 10, a comparator 12, a reference voltage generator 13, and an accumulation control signal generating portion 14. The minimum detector 10 selects and delivers one of the outputs from the monitoring pixels of the standard portion 7 and the reference portion 8 which has a lower level. The comparator 12 compares the output from the minimum detector 10 and the reference voltage from the reference voltage generator 13. On the basis of a result of the comparison from the comparator 12, the accumulation control signal generating portion 14 controls the control electrodes 5-1 and 5-2 of the standard portion 7 and the reference portion 8. An operation of the signal control portion 6' is similar to that of the signal control portion 6 of the foregoing embodiment except that the same control signal is supplied to the control electrodes of both the standard portion 7 and the reference portion 8 and, therefore, description thereof will be omitted herein.

The minimum detector 10 delivers one of the outputs from the monitoring charge detectors 2-3 and 2-4 of the standard portion 7 and the reference portion 8 which has a high negative voltage value when bright light is incident. The comparator 12 compares the output of the minimum detector 10 with the reference voltage. The control electrodes are controlled by the control signal from the accumulation control signal generating portion 14. Therefore, the signal of each of the pixel arrays of the standard portion 7 and the reference portion 8 is controlled to have an optimum signal amount without saturation.

Referring to FIG. 7, the minimum detector 10 has a circuit structure comprising two source follower circuits, i.e., first and second source follower circuits 24-1 and 24-2, having output lines connected to each other. The first source follower 24-1 comprises two P-type MOS transistors 28-1 and 28-3. Similarly, the second source follower 24-2 comprises two P-type MOS transistors 28-2 and 28-4. Each of the transistors 28-3 and 28-4 has a drain, a source, and a gate which are connected to an output line, a power source, and a voltage source, respectively, and is operated as a constant current source.

The drive transistor 28-1 has a drain, a source, and a gate which are connected to a ground voltage (GND), the output line, and an input terminal 22-1, respectively. Similarly, the drive transistor 28-2 has a drain, a source, and a gate which are connected to a ground voltage (GND), the output line, and an input terminal 22-2, respectively. In case where each of the first and the second source followers 24-1 and 24-2 is operated as a single and independent source follower, an electric current of each of the transistors 28-1 and 28-2 is varied by an electric voltage applied to each of the input terminals 22-1 and 22-2 and an electric voltage following each of the transistors 28-1 and 28-2 is supplied to an output line 23.

In case where the output lines of the first and the second source follower circuits 24-1 and 24-2 are connected to each other, a voltage on the output line 23 is determined in response to the input voltages applied to the input terminals 22-1 and 22-2, as shown in FIG. 8. In case where the minimum detector 10 is constituted by the use of the P-type MOS transistors, an output signal on the output line 23 follows a lower one of the input voltages Vin1 and Vin2 applied to the input terminals 22-1 and 22-2. That is, the minimum detector 10 supplies to the output line 23 one of the input voltages Vin1 and Vin2 which has a lower level. As shown in FIG. 8, a, b, c, and d show outputs in case where input voltages Vin1 and Vin2 supplied to the input terminal 22-1 and the input terminal 22-2 are equal to each other. In case where the circuit of the present invention is used, assuming that the input voltage Vin2 is a constant voltage b, the output is not further varied to a higher level even if the input voltage Vin1 becomes greater than the input voltage Vin2. Thus, as shown in the figure, the output along a line b1 is produced.

In case where the input voltage Vin1 of the input terminal 22-1 is greater than the input voltage Vin2 of the input terminal 22-2, an electric current flowing through the transistor 28-1 is reduced so that the transistor 28-1 is operated in a direction of increasing the voltage on the output line 23. However, with respect to the direction of increasing the voltage on the output line 23, the transistor 28-2 operates in a direction of flowing an electric current. Therefore, even if the input voltage at the input terminal 22-1 is increased, the voltage on the output line 23 is maintained at a value determined by the input voltage at the input terminal 22-2.

Referring to FIG. 9, a minimum detector 10' is a modification of the minimum detector 10. The minimum detector 10 shown in FIG. 7 comprises the two source follower circuits in which the drive transistors 28-1 and 28-2 are provided with the load transistors 28-3 and 28-4, respectively. However, the two load transistors need not be provided as long as they perform the same operation as the constant current source. In other words, the load transistors 28-3 and 28-4 may be combined into a single transistor 28-5. The minimum detector 10' in FIG. 9 comprises the single transistor 28-5 as the constant current source. A structure and an operation of the transistor 28-5 are similar to those of the transistors 28-3 and 28-4 shown in FIG. 7. Therefore, description thereof will be omitted herein.

In the minimum detectors 10 and 10' shown in FIGS. 7 and 9, the input terminals 22-1 and 22-2 are supplied with the outputs from the monitoring charge detectors of the standard portion 7 and the reference portion 8. In this case, the minimum detector produces an output voltage corresponding to one of the output voltages from the monitoring charge detectors of the standard portion 7 and the reference portion 8 which has a lower level. Therefore, each of the signals of the pixel arrays of the standard portion 7 and the reference portion 8 is controlled to have an optimum signal amount without saturation. Thus, each of the pixel array charge detectors of the standard portion 7 and the reference portion 8 produces a constant output.

Further, in the minimum detectors 10 and 10' shown in FIGS. 7 and 9, the transistors 28-3, 28-4, and 28-5 as the constant current sources may be replaced by other elements, such as resistors. Furthermore, the minimum detector may comprise three or more source follower circuits. In this case also, a value determined by the minimum one of the input voltages supplied to the input terminals is produced via the output line.

The autofocus image sensor according to the present invention comprises the standard portion having the pixel array, the pixel array charge detector for producing a signal corresponding to a light amount generated in the pixel array, the monitoring pixels for use in monitoring an average light amount of the pixel array, and the monitoring charge detector for producing a signal corresponding to the light amount received in the monitoring pixels, the reference portion having a structure same as that of the standard portion, and the signal control portion for carrying out control so that the output signal of the pixel array charge detector is kept constant. By the signals from the monitoring charge detectors of the standard portion 7 and the reference portion 8, it is possible to control the pixel arrays to thereby obtain an optimum signal amount without saturation of the signals of the pixel arrays. With this structure, the autofocus image sensor can be obtained in which an error in position detection is minimized.

Although description has thus far been made about the present invention in connection with the embodiments, the present invention is not limited to the foregoing embodiments and various modifications may be made without departing from the scope of the invention. It will readily be understood for those skilled in the art that the present invention encompasses such modifications.

The present invention is applicable to the autofocus image sensor.

What is claimed is:

1. An image sensor comprising a standard portion and a reference portion, each of the standard portion and the reference portion comprising a pixel array, a pixel array charge detector producing a signal corresponding to a light amount received in the pixel array, a control electrode controlling supply of charges from the pixel array to the pixel array charge detector, monitoring pixels monitoring an average light amount of the pixel array, and a monitoring charge detector producing a signal corresponding to a light amount received in the monitoring pixels, wherein:

the image sensor further comprises a signal control portion carrying out control so that each of the output signals from the pixel array charge detectors of the standard portion and the reference portion is kept constant;

the signal control portion comprising a minimum detector, a comparator, a reference voltage generator, and a control signal generating portion, the minimum detector producing an output signal corresponding to one of the two output signals from the monitoring charge detectors of the standard portion and the reference portion which has a lower level, the comparator comparing an output from the minimum detector with a reference voltage generated by the reference voltage generator, the control signal generating portion controlling the control electrodes of the standard portion and the reference portion on the basis of a result of comparison by the comparator.

2. An image sensor comprising a standard portion and a reference portion, each of the standard portion and the reference portion comprising a pixel array, a pixel array charge detector producing a signal corresponding to a light amount received in the pixel array, a control electrode controlling supply of charges from the pixel array to the pixel array charge detector, monitoring pixels monitoring an average light amount of the pixel array, and a monitoring charge detector producing a signal corresponding to a light amount received in the monitoring pixels, wherein:

the image sensor further comprises a signal control portion carrying out control so that each of the output signals from the pixel array charge detectors of the standard portion and the reference portion is kept constant;

the signal control portion comprising first and second comparators, a reference voltage generator, and a control signal generating portion, the first comparator comparing the output signal of the monitoring charge detector of the standard portion with a reference voltage generated by the reference voltage generator, the second comparator comparing the output signal of the monitoring charge detector of the reference portion with the reference voltage generated by the reference voltage generator, the control signal generating portion being supplied with outputs of the first and the second comparators and controlling the control electrodes of the standard portion and the reference portion on the basis of results of comparison by the first and the second comparators.

3. The image sensor as claimed in claim 1, wherein the pixel arrays and the monitoring pixels of the standard portion and the reference portion are symmetrically disposed with respect to a center of an image area of the image sensor.

4. The image sensor as claimed in claim 2, wherein the pixel arrays and the monitoring pixels of the standard portion and the reference portion are symmetrically disposed with respect to a center of an image area of the image sensor.

5. The image sensor as claimed in claim 1, wherein, in each of the standard portion and the reference portion, the monitoring pixels monitoring the average light amount of the pixel array are disposed adjacent to the pixel array.

6. The image sensor as claimed in claim 2, wherein, in each of the standard portion and the reference portion, the monitoring pixels monitoring the average light amount of the pixel array are disposed adjacent to the pixel array.

7. The image sensor as claimed in claim 1, wherein, in each of the standard portion and the reference portion, the monitoring pixels monitoring the average light amount of the pixel array are arranged over a width same as that of the pixel array.

8. The image sensor as claimed in claim 2, wherein, in each of the standard portion and the reference portion, the monitoring pixels monitoring the average light amount of the pixel array are arranged over a width same as that of the pixel array.

9. The image sensor as claimed in claim 1, wherein the minimum detector comprises a first source follower circuit and a second source follower circuit, the first source follower circuit comprising a first constant current source disposed between a power source and an output line and a drive transistor having a gate supplied with the signal from the monitoring charge detector of the standard portion, the second source follower circuit comprising a second constant current source disposed between a power source and an output line and a drive transistor having a gate supplied with the signal from the monitoring charge detector of the reference portion, the output lines of the first and the second source follower circuits being connected to each other.

10. The image sensor as claimed in claim 1, wherein the minimum detector comprises a constant current source disposed between a power source and an output line and a plurality of transistors connected between the output line and a ground voltage, the transistors having gates supplied with the outputs from the monitoring charge detectors of the standard portion and the reference portion, respectively.

* * * * *